Figure 6:
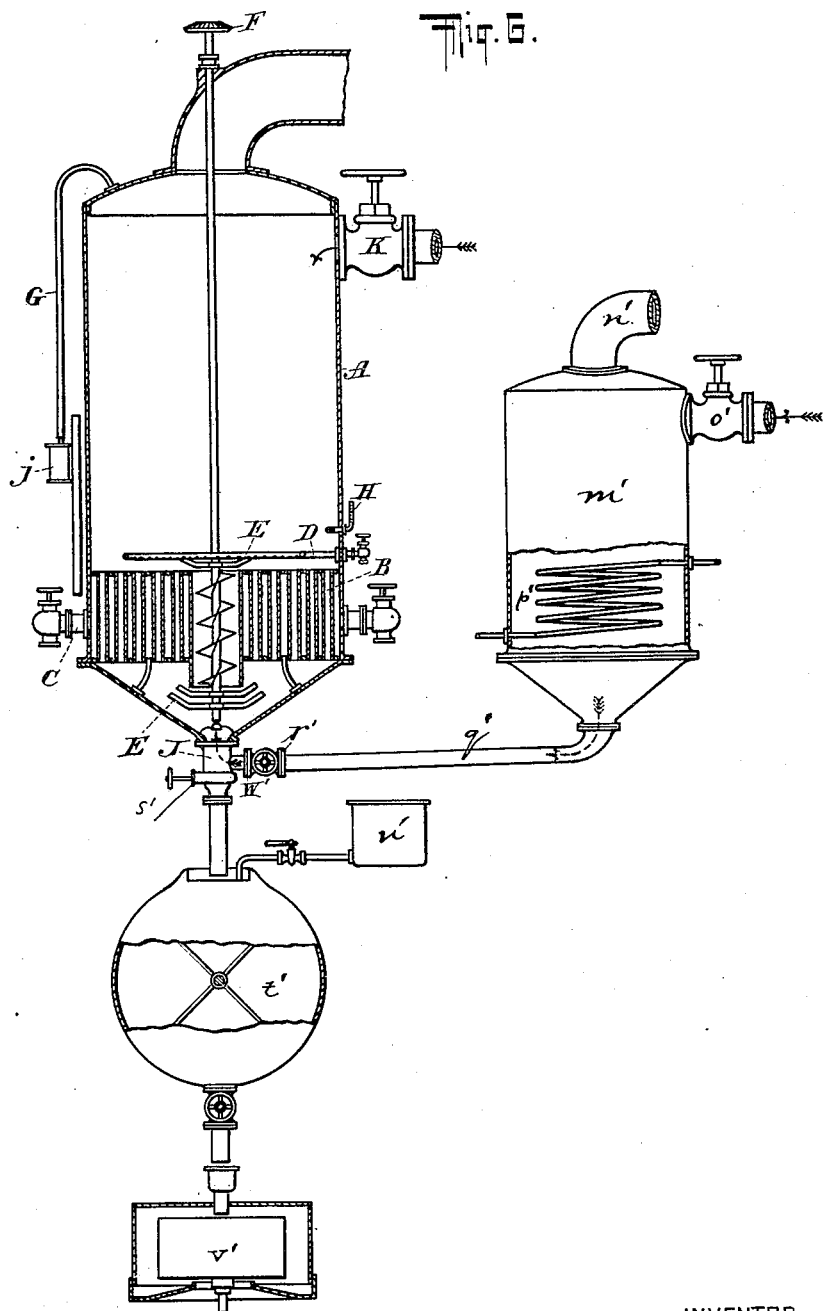

No. 673,496. Patented May 7, 1901.
H. CLAASSEN.
PROCESS OF PRODUCING SUGAR IN CRYSTAL FORM.
(Application filed Sept. 22, 1900.)
(No Model.) 3 Sheets—Sheet 1.
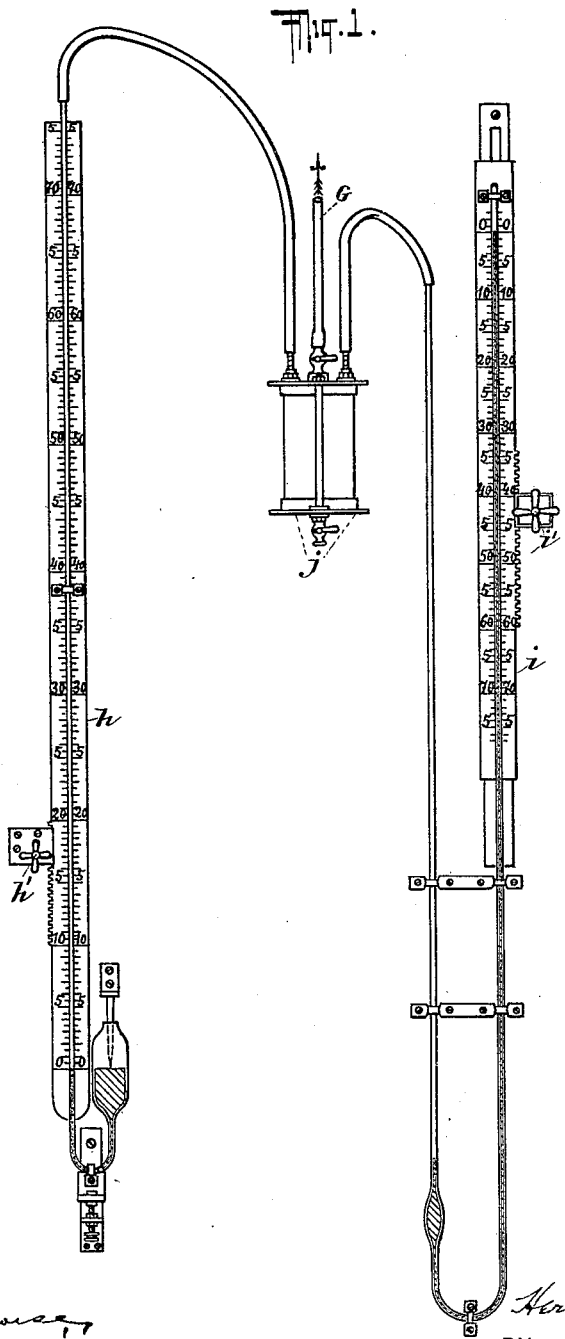
WITNESSES:
INVENTOR
Hermann Claassen
BY Briesen J Knauth
ATTORNEYS No. 673,496. Patented May 7, 1901.
H. CLAASSEN.
PROCESS OF PRODUCING SUGAR IN CRYSTAL FORM.
(Application filed Sept. 22, 1900.)
(No Model.) 3 Sheets—Sheet 2.

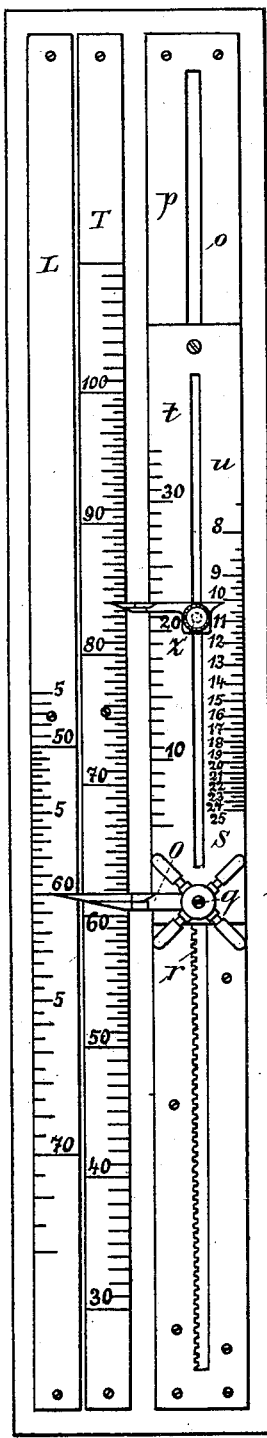

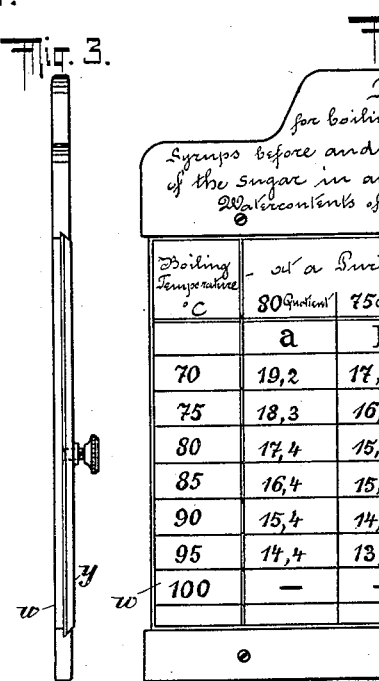

Fig. 3ª

Table for boiling the run off Syrups before and during the introduction of the sugar in any form. Watercontents of the Syrups.

| Boiling Temperature °C | At a Purity of Syrup of | | | |
|---|---|---|---|---|
| | 80 Quotient | 75 Quotient | 70 Quotient | 65 Quotient |
| | a | b | c | d |
| 70 | 19,2 | 17,5 | 15,4 | 14,0 |
| 75 | 18,3 | 16,7 | 14,7 | 13,3 |
| 80 | 17,4 | 15,9 | 13,9 | 12,6 |
| 85 | 16,4 | 15,0 | 13,1 | 11,9 |
| 90 | 15,4 | 14,1 | 12,3 | 11,1 |
| 95 | 14,4 | 13,2 | 11,5 | 10,3 |
| 100 | — | — | — | — |

Fig. 3ᵇ

Table for boiling the run off Syrups after the introduction of the sugar in any form. Watercontents of the Syrups.

| Boiling Temperature °C | Purity of the Syrup at the grain forming stage | | | during the Boiling lowering down to | | | while boiling to finish |
|---|---|---|---|---|---|---|---|
| | 80 | 75 | 70 | in the 1st third | in the 2d third | in the 3d third | |
| | a | b | c | d | e | f | g |
| 70 | 17,3 | 15,2 | 13,2 | 12,5 | 12,0 | 11,5 | 11,0 |
| 75 | 16,4 | 14,5 | 12,5 | 12,0 | 11,5 | 11,0 | 10,5 |
| 80 | 15,6 | 13,8 | 11,9 | 11,5 | 11,0 | 10,5 | 10,0 |
| 85 | 14,7 | 13,0 | 11,2 | 11,0 | 10,5 | 10,0 | 9,3 |
| 90 | 13,8 | 12,2 | 10,5 | 10,3 | 10,0 | 9,5 | 8,7 |
| 95 | 12,9 | 11,4 | 9,7 | 9,5 | 9,0 | 8,5 | 8,1 |
| 100 | — | — | — | — | — | — | 7,7 |

WITNESSES:

INVENTOR
Hermann Claassen
BY Briesen & Knauth
ATTORNEYS.

No. 673,496. Patented May 7, 1901.
H. CLAASSEN.
PROCESS OF PRODUCING SUGAR IN CRYSTAL FORM.
(Application filed Sept. 22, 1900.)
(No Model.) 3 Sheets—Sheet 3.

WITNESSES: INVENTOR
Hermann Claassen
BY Briesen & Krantz
ATTORNEYS

UNITED STATES PATENT OFFICE.

HERMANN CLAASSEN, OF DORMAGEN, GERMANY.

PROCESS OF PRODUCING SUGAR IN CRYSTAL FORM.

SPECIFICATION forming part of Letters Patent No. 673,496, dated May 7, 1901.

Original application filed January 4, 1900, Serial No. 301. Divided and this application filed September 22, 1900. Serial No. 30,831. (No specimens.)

*To all whom it may concern:*

Be it known that I, HERMANN CLAASSEN, a subject of the King of Prussia, Emperor of Germany, and a resident of Dormagen, Rhenish Prussia, German Empire, have invented new and useful Improvements in Processes for Producing Sugar in Crystal Form from Syrups, of which the following is a specification.

This application is a division of my application, Serial No. 301, filed January 4, 1900, upon which United States Letters Patent No. 664,465, dated December 25, 1900, were issued. In that patent I have described a process for the production of sugar crystals out of syrup, in which process indirect heating-steam is used to produce a desired superconcentration of the syrup alternating with the use of direct steam introduced into the mass for maintaining it at a temperature corresponding with the vacuum for the time being. By this process the formation of crystals takes place out of the syrup itself, whereby the crystals so produced serve as exciters for the further crystallizing out of the syrup. In some instances, however, I have found it of great advantage not to form the crystals directly out of the syrup by boiling to grain, but to introduce sugar crystals of suitable form into the syrup, which will serve to initiate crystallization. By this process the sugar crystallizing out of the syrup settles down on the surface of the introduced crystals. This method of working, in connection with alternately using indirect heating-steam and direct steam introduced into the mass, as well as the maintaining of fixed water percentages of the syrup during the boiling process, will be of special advantage in such cases where it is desired to obtain extraordinarily large crystals. This will also be the case whenever it becomes necessary to make sugar out of very impure syrups, as the boiling of the latter to grain can only be accomplished by very slow boiling, and in some cases it even becomes altogether impossible. The crystals to be put into the syrup may be of widely-different character and quality. Raw sugar or masse-cuite, first product or after products, powder-sugar or sugar-dust may be used for this purpose.

It should be well understood that by the method as above explained the syrup into which the crystals are introduced in order to excite its crystallization must be in a state of feeble superconcentration. Should the syrup only be concentrated—*i. e.*, should it be impossible to dissolve any more sugar therein— no crystallizing out of sugar could take place out of such a solution. On the other hand, should the syrup be highly superconcentrated new crystals would be formed out of such syrup. This formation of new crystals, however, is not desired; but the sugar while separating itself from the syrup should deposit on the crystals introduced into the solution. This is only possible when the solution is of feeble superconcentration. The superconcentration of the syrup can only be obtained by boiling it. The required degree of superconcentration depends upon the purity of the syrup and changes in accordance with it. It will therefore vary in accordance with the degree of the purity of the syrup. As before stated, superconcentration is maintained to such a degree that no new crystals will be formed after the sugar crystals to serve as exciters of crystallization are put into the mass, while at the same time no dissolving of these crystals can occur. By working in the above-described manner the coefficient of superconcentration of the syrup must therefore be kept above one, but at the same time it must be kept lower than the one necessary for the formation of grain out of the syrup. If a syrup of, say, eighty to sixty-five purity is boiled to grain, the coefficient of superconcentration will be 1.20 to 1.50; but by working in accordance with my process the coefficient of superconcentration of a syrup of eighty to sixty-five purity will be between 1.05 and 1.20. Therefore the percentage of water of the syrup which is to be crystallized out must correspond with the coefficient of superconcentration of this process while drawing in the sugar crystals to be used as exciters of crystallization. In order to obtain and to maintain such percentage of water, the controlling apparatus described in my United States Patent No. 661,756, under date of November 13, 1900, should be used.

In the accompanying drawings I have shown an apparatus for carrying out my invention.

In the drawings, Figure 1 indicates a double vacuum-gage. Fig. 2 represents the calculating-scale. Fig. 3ª is a table containing information concerning the percentage of water of the syrups while boiling before and during the addition of sugar. Fig. 3ᵇ is a table of the water contents of the mass after the addition of sugar. Fig. 4 is a side view of the tables shown in Figs. 3ª and 3ᵇ. Fig. 5 is a face view of the indicating-slide of the tables. Fig. 6 is a sectional elevation of the apparatus.

In the drawings, Fig. 1 shows a double vacuum-gage consisting of two gages $h\ i$, communicating with the vessel $j$, which communicates by a tube C with the vacuum-pan. The vacuum-gages are adjustable for calibration by adjusting means $h'\ i'$, so that the vacuum-gages can be adjusted in accordance with the prevailing atmospheric pressure. As before stated, the double vacuum-gage communicates with the vacuum-pan, which consists of an outer shell A, a heating apparatus B, consisting of a chamber traversed by vertical pipes by which the liquid in the lower and upper part of the pan may circulate. The pipe C is for the purpose of introducing indirect or heating steam into the heating apparatus B. D indicates the pipes for introducing direct steam into the vacuum-pan. E is the stirring device rotated by the gearing F. H indicates the thermometer, and J the pipe for drawing off the ready masse-cuite, and K is the pipe for drawing in the syrup. The vacuum-pan A is connected by piping $w'$ and $q'$ with a small auxiliary vacuum-pan $m'$, supplied with the pipe $n'$, leading to the vacuum-pump, pipe $o'$ for introducing juice or syrup into pan $m'$, heating apparatus $p'$, and outlet-pipe $q'$, provided with a valve $r'$. Below the entrance of pipe $q'$ into the outlet $w'$ of the vacuum-pan A a slide-valve $s'$ is arranged, so that the pan A may be connected to the auxiliary vacuum-pan $m'$ for drawing in into A masse-cuite which has been boiled to grain in the pan $m'$, which grain acts as an exciter of crystals in the masse-cuite boiled in the vacuum-pan A, or the pan A may be connected with the crystallizing apparatus $t'$ by closing the valve $r'$ and opening the slide-valve $s'$ for the masse-cuite of A, mixed with the grain containing masse-cuite of $m'$, to run into the said apparatus $t'$. The latter is connected with a box $u'$ for admitting a diluent of predetermined quantity in the apparatus $t'$. $v'$ is the centrifuging-machine for separating the crystals from the mother-liquid.

The process is carried out in the vacuum-pan, as hereinafter described, the structure shown in Fig. 1 being employed to give the air-pressure in the vacuum-pan.

The structures shown in Figs. 2, 3ª, 3ᵇ, 4, and 5 are employed to aid the sugar-boiler in carrying out the process and enable him to maintain a proper degree of superconcentration at every stage of the process.

In Fig. 2 is shown a base $k$, provided with a plurality of scales L T. The scale L indicates centimeters of vacuum, and the scale T indicates temperatures at which water will boil at such vacua, the two scales being so correlated with each other that a single index may be employed, coöperating with both scales, the vacuum indicated by the index corresponding with the temperature indicated thereby, so that by setting the index at any point in the vacuum-scale the boiling-point of water at that vacuum will be indicated on the temperature-scale. I have also shown a double scale S, which slides freely upon rails $o\ p$, being movable thereon by pinion or handle $q$. The pinion, which is not shown, meshes with the rack $r$ on the side of the rail $p$. The double scale S consists of a temperature-scale $t$, which indicates degrees of temperature, the divisions on the scale $t$ corresponding in size with the divisions on the scale T, the numerals on the scale $t$ indicating temperatures which the boiling syrup has in excess of the boiling-point of water at the same vacuo. The other scale $u$ of the double sliding scale S shows the percentage of water contained by the syrups if the raising of boiling-point is equal to the exact opposite degrees on scale $t$. The sliding scale S is provided with an indicator O, stationary with respect to the said scale when the apparatus is in use. This indicator coöperates with the vacuum-scale and the temperature-scale T. The sliding scale S is provided with a sliding indicator Z, which coöperates with the scales $t$, $u$, and T.

In Fig. 3ᵇ I have shown a table in which the percentage of water contained in the liquid treated is given after the introduction of the sugar. In the columns $a^2\ b^2\ c^2\ d^2\ e^2\ f^2\ g^2$ the percentage of water of various of the stages of the operation are given. This table consists of an undercut or mortised board $w$, in which a slide $y$ slides. This slide $y$ is provided with a temperature-scale and with an aperture X, so that the said slide may be moved along the table for a convenient reference to avoid the possibility of mistake.

In using the calculating device the double scale is moved until the indicator O points to that place on the vacuum-scale which corresponds to the figure indicated by the vacuum-meter. Thereupon the boiling-table is consulted and the movable indicator is adjusted to that point on the scale $u$ which corresponds to the percentage of water desired, whereupon the boiling is effected at the temperature on the scale T indicated by Z. It will thus be seen that the sugar-boiler has at hand the means for directing the boiling of syrups or juices with the greatest exactness. It will also be observed that this apparatus enables me to calculate the percentage of water of the juice or syrup at any temperature and pressure.

Table Fig. 3ª, which is similar in construction to the table shown in Fig. 3ᵇ, is used for the purpose of boiling the syrup to a condition of superconcentration corresponding to its purity and also to keep its water contents at the point necessary while drawing in the crystals used as exciters of crystallization.

As the sugar introduced in the form of crystals may have a lower temperature than the contents of the vacuum-pan, provision must be made that the temperature throughout the entire vacuum-pan is kept up to the boiling-point while sugar crystals are slowly drawn into the pan in order to prevent any local cooling down in the apparatus. This is done by introducing direct steam into the mass, which latter should also be stirred by mechanical means all the time while boiling.

It is not advisable, after finishing the drawing in of the exciting-crystals to increase the superconcentration of the syrup at once to the point required by the continuous treatment of the syrup which is to be crystallized out and which is shown in table Fig. 3$^b$. On the contrary, the reduction of the water percentage must proceed by slow and gradual evaporation.

After the desired percentage of water is reached according to table Fig. 3$^b$ the process is continued as described in my Patent No. 664,465, dated December 25, 1900.

The process, improved in the above-mentioned manner, for obtaining sugar in form of crystals out of syrups will be performed in the following way: I subject the syrup first drawn into the vacuum-pan to a concentration corresponding to its purity according to table Fig. 3$^a$. This is done by boiling the syrup with indirect heating-steam—i. e., using steam in the same manner as ordinarily used for heating purposes. This steam does not enter into nor does it come in direct contact with the mass. When the desired point of superconcentration is attained, the admission of indirect heating-steam is interrupted and direct steam is introduced into the mass. By means of this steam the temperature of the mass is maintained in accordance with the existing vacuum, whereby the condition of superconcentration is not changed, while mechanical stirring of the mass will be continued constantly. I then proceed to draw slowly into the syrup, which has been concentrated in the aforesaid manner, the sugar crystals of any suitable form, which will serve as exciters for the syrup to be crystallized out. After completing the drawing in of the sugar crystals I can shut off the direct steam and use the indirect steam, whereby the water contents of the syrup will be reduced through boiling. At this stage of the process I can retard the reduction of the water contents of the syrup by slowly drawing in additional syrup. The process of concentration while temporarily shutting off the indirect heating-steam and introducing direct steam into the mass is continued until the percentage of water reaches the point shown in table Fig. 3$^a$ respecting the purity of the syrup. Thereafter the boiling process is continued as described in my Patent No. 664,465. After the boiling and concentrating process is finished and the vacuum-pan is filled with masse-cuite this mass when cooling down will show such viscosity that its further crystallizing out will prove difficult. In order to reduce its viscosity, I treat this masse-cuite after it is lowered into suitable vessels by continuously or periodically adding water or molasses to it. This introduction of water or molasses will diminish the viscosity of the mass. It should, however, be limited to such an extent that the superconcentration of the mother-syrup is not completely neutralized, but only to a certain degree, as it may happen that by adding water a solution of the sugar crystals already separated takes place. This further crystallization of the masse-cuite in a diluted state may take place either while the mass is in motion or when it is at rest.

What I claim, and desire to secure by Letters Patent, is—

The herein-described process of producing sugar which consists in producing a concentration of the juice or syrup *in vacuo* in accordance with its purity by means of indirect heating-steam, interrupting the flow of such steam and thereupon introducing steam directly into the mass for the purpose of maintaining a temperature in accordance with the vacuum without changing the degree of concentration of the mass, then introducing sugar into the mass to serve as an exciter of crystallization, then shutting off the steam which is being directly introduced into the mass, and drawing in fresh syrup, continuing the alternate use of indirect steam for producing concentration as required by the condition of the boiling process for the time being and of directly-introduced steam for maintaining the temperature without changing the degree of concentration, meanwhile continually stirring the mass by means other than the steam and thereupon treating the mass for the purpose of further crystallizing out, reducing its viscosity by adding a diluent in conformity with the lowering of the temperature and separating the sugar so produced from the molasses, substantially as specified.

In testimony that I claim the foregoing as my invention I have signed my name, in presence of two witnesses, this 10th day of September, 1900.

HERMANN CLAASSEN.

Witnesses:
 WILLIAM ESSENWEIN,
 LUDWIG HIRT.